United States Patent Office 3,545,917
Patented Dec. 8, 1970

3,545,917
METHOD OF DECOMPOSING NITROGEN OXIDES
Ruth E. Stephens, Detroit, Mich., assignor to Ethyl Corporation, New York, N.Y., a corporation of Virginia
No Drawing. Filed Oct. 10, 1967, Ser. No. 674,110
Int. Cl. B01d 53/00
U.S. Cl. 23—2                                                  8 Claims

ABSTRACT OF THE DISCLOSURE

The nitric oxide content of a gas stream containing nitric oxide is reduced by contacting the gas stream with either a praseodymium oxide or lanthanum oxide catalyst at a temperature above about 400° C.

BACKGROUND

The exhaust gas of internal combustion engines contains unburned hydrocarbons, carbon monoxide, nitrogen oxides and oxygen, among other materials. Investigators have reported that nitrogen oxides in the presence of sunlight lead to ozone formation, and that ozone reacts with hydrocarbon substituents in the atmosphere to form noxious materials. Therefore, extensive research has been carried out directed at means of removing the precursor materials, nitrogen oxides and hydrocarbons, from the atmosphere. The present invention describes a catalyst and method of using this catalyst to reduce the oxides of nitrogen content of the atmosphere by contacting exhaust gas of internal combustion engines or other exhaust streams containing oxides of nitrogen with a highly selective catalyst.

SUMMARY

This invention relates to a catalyst eminently useful for decomposing oxides of nitrogen. In particular, this invention relates to praseodymia oxide and lanthanum oxide catalysts and to methods of decomposing oxides of nitrogen employing these catalysts.

An object of this invention is to provide a catalyst capable of rendering oxides of nitrogen less noxious. A further object is to provide a catalyst for decomposing nitrogen oxides into nitrogen and oxygen. A still further object is to provide a catalytic means of reducing the oxide of nitrogen content of gas streams containing nitrogen oxides. A particular object is to provide a catalytic means of reducing the nitrogen oxides content of the exhaust gas of internal combustion engines.

These and other objects are accomplished by providing a catalyst consisting essentially of a catalyst support containing from about 0.001 to 25 weight percent of an active agent selected from the group consisting of praseodymia and lanthanum in an oxide form.

In a preferred embodiment, the catalyst consists essentially of a catalyst support selected from the group consisting of zirconia, calcium aluminate, alumina, magnesia, silica, silica alumina, zinc oxide, zircon, mullite and kaolin, or mixtures of these support materials, containing from 0.001 to 25 weight percent active agent.

In highly preferred embodiments, the catalyst consists essentially of zinc oxide or zirconia containing from 0.001 to 25 weight percent praseodymia, lanthanum, or mixtures of the two, in an oxide form.

Suitable supports for the catalysts include all the materials normally used for catalyst supports that are capable of being used in the particular environment in which use is intended and which does not destroy the catalytic activity. Examples of such materials include zirconia, calcium aluminate, alumina, magnesia, silica, silica alumina, zinc oxide, zircon, mullite, kaolin, and the like, including supports prepared from mixtures of these ingredients. The preferred supports are zirconia and zinc oxide.

The catalyst can be prepared by any one of the many methods known to catalyst manufacturers. A suitable support can be merely impregnated with a solution of a soluble salt of praseodymia or lanthanum such as praseodymium nitrate, praseodymium acetate, lanthanum nitrate or lanthanum acetate, followed by calcining to decompose the salt to an oxide form. Another method is to mix praseodymium or lanthanum oxide with a precursor of the support material. For example, an alumina gel can be formed by adding sodium hydroxide to an acidic solution of an aluminum salt such as aluminum nitrate dissolved in aqueous nitric acid. Praseodymium oxide or lanthanum oxide powder can be mixed with the gel forming a paste, which is extruded, dried, and then calcined. In a similar manner, the praseodymia or lanthanum may be in solution together with the aluminum salt and co-precipitate with the gel when base is added. The resulting gel can be extruded, dried, and calcined, or mixed with other support material such as kaolin, forming a paste which is then extruded, dried, and calcined.

The following examples will serve to illustrate several of the methods available for preparing the praseodymium oxide and lanthanum oxide containing catalysts of this invention. All parts are parts by weight unless otherwise specified.

EXAMPLE 1

A praseodymia containing solution was prepared by adding 68 parts of praseodymium oxide to a solution containing 36 parts glacial acetic acid, 49.7 parts of 70 percent nitric acid and 200 parts of water. 3.2 parts of this solution were mixed with 8 parts of praseodymium oxide, forming a paste. This paste was dried in an oven at 105° C. until the free water had been removed. It was then broken up into small pieces and calcined by heating to a temperature of 700° C. The resultant unsupported praseodymium oxide catalyst effectively catalyzed the decomposition of nitric oxide to nitrogen and oxygen.

EXAMPLE 2

A zinc oxide supported praseodymium oxide containing catalyst was prepared as follows. In a mixing vessel was placed 220 parts of praseodymium oxide and sufficient 70 percent nitric oxide to dissolve the praseodymium oxide. Following this, 1230 parts of 6–10 mesh zinc oxide pellets were placed in the solution. After the solution impregnated the zinc oxide pellets they were dried and then calcined at 700° C. The resultant catalyst effectively decomposed nitric oxide into nitrogen and oxygen when contacted with a gas stream containing nitric oxide at about 700° C.

EXAMPLE 3

In the mixing vessel of Example 1 was placed 433 parts of lanthanum nitrate hexahydrate and 600 parts of water. After dissolving, the solution was used to impregnate 1000 parts of a high zirconia content support (Zircon-Norton LZS 4045 $\frac{3}{16}$" spheres). It was then dried and calcined at 800° C., resulting in a catalyst of high activity in decomposing nitric oxide.

EXAMPLE 4

To a mixing vessel is added 200 parts of praseodymium oxide, 692 parts of activated alumina and 1300 parts of hydrated alumina (28 percent $H_2O$). These materials are mixed for 10 minutes. Following this, 100 parts of an aqueous nitric acid solution containing 15 parts of 70 percent nitric acid is added. Mixing is continued while 130 additional parts of hydrated alumina are slowly added. A plastic mass is formed due to the gelling of the hydrated alumina. This material is extruded through a 3/16 inch die into pieces about 1/4 inch long. The extrudate is dried, and then calcined at 750° C. for an hour, resulting in an alumina supported catalyst containing 9.5 percent praseodymnia in an oxide form.

EXAMPLE 5

To a mixing vessel is added 400 parts of lanthanum oxide, 460 parts of activated alumina, 230 parts of kaolin and 1300 parts of hydrated alumina (28 percent $H_2O$). These materials are thoroughly mixed and then an aqueous solution containing 13 parts of 70 percent nitric acid in 100 parts of water is added. While mixing, an additional 140 parts of hydrated alumina is added and mixing is continued until a plastic mass forms. This material is extruded through a 1/4 inch die forming pieces 1/4 inch long. This extrudate is dried at 150° C. until all free water is evaporated and then calcined at 650° C. for 2 hours, resulting in an alumina-kaolin supported catalyst containing 16.4 percent lanthanum in an oxide form.

EXAMPLE 6

In an impregnating vessel is placed 1000 parts of a zirconia support containing 5 percent silica. To this is added an aqueous solution containing 300 parts of praseodymium nitrate in sufficient water to cover the support. The mixture is allowed to stand until the support has absorbed most of the solution. Following this, the impregnated support is dried in an oven at 150° C. until most of the free water has evaporated, and then calcined at 800° C. for 2 hours, causing the praseodymium nitrate to decompose to the oxide form. The resulting catalyst is a zirconia supported catalyst containing 14 percent praseodymia in an oxide form.

EXAMPLE 7

In an impragnating vessel is placed 1000 parts of magnesia pellets. To this is added an aqueous solution containing 500 parts of lanthanum nitrate in sufficient water to cover the magnesia. The mixture is allowed to stand for 2 hours and the remaining water is removed by evaporation in an oven at 150° C. After the free water has been evaporated the remaining catalyst is calcined at 750° C. for one hour. The resulting catalyst is a magnesia supported catalyst containing about 25 percent lanthanum in an oxide form.

In the foregoing examples, support materials other than those used can be employed. For example, alumina, magnesia, zirconia, silica, silica alumina, zinc oxide, zircon, mullite, kaolin, and the like, can be used, resulting in a supported praseodymium oxide or lanthanum oxide catalyst.

In like manner, the concentration of the active agent in the catalyst can be varied by using different concentrations of praseodymia or lanthanum solutions or using different quantities of oxide in the preparation. Also, solutions containing mixtures of praseodymia and lanthanum salts can be used to give catalysts containing both praseodymia and lanthanum in an oxide form.

The catalysts are effective over a wide temperature range but must be heated to a minimum temperature before their activity initiates. Generally, the temperature must be above about 400° C. before the catalysts become active. A generally effective temperature range is from 400–1000° C., and a more preferred range is from about 700–850° C.

Tests have been carried out which demonstrate the ability of praseodymium and lanthanum oxide to catalyze the decomposition of oxides of nitrogen. In these tests a stream of helium was passed through a heated catalyst bed and then through a vapor phase chromatograph. The vapor phase chromatograph was adjusted to baseline with the helium stream. A small amount of nitric oxide was then injected into the helium stream ahead of the catalyst bed. The vapor phase chromatograph then determined the composition of the gas stream after contacting the catalyst.

The above test was carried out using a praseodymium oxide catalyst as prepared in Examples 1 and 2. The bed temperature was maintained at 700–800° C. The vapor phase chromatograph showed that the nitric oxide had been decomposed into nitrogen and oxygen.

Another test was conducted using a zinc oxide supported catalyst as prepared in Example 2. This catalyst was maintained at 750° C. and decomposed essentially all the nitric oxide which passed through it. In order to determine if the decomposition was due to the zinc oxide or to the praseodymium oxide, a further test was carried out on the zinc oxide support and it was found to be inactive.

Futher tests were conducted by passing the exhaust gas from a single cylinder 36 cubic inch spark ignited engine operated at an air/fuel ratio of 13.7 through a catalyst bed containing a zinc oxide supported prasodymium oxide catalyst. A 40 percent reduction in the oxides of nitrogen in the exhaust gas was observed.

Good results were also obtained when the foregoing tests were carried out on similar lanthanum oxide catalysts.

In order to use the catalyst in an internal combustion engine exhaust system, the catalyst is incorporated in a suitable manner into the exhaust system of the engine. One method commonly used is to place the catalyst in a so-called "catalytic muffler." Examples of these are disclosed in U.S. Patents 3,154,389; 3,149,925; 3,149,926 and 3,146,073, among others. Essentially these are containers having an opening to receive and discharge the exhaust gas. To firmly retain the catalyst material, the receiving and discharge openings are covered with wire screen. The container may have internal baffling to allow greater contact between catalyst and exhaust gas or to use the hot reaction gases to heat the incoming exhaust gases. The container may actually replace the vehicle muffler or may be incorporated into the conventional exhaust system of current vehicles. The catalyst bed may also be located in the exhaust manifold of the engine.

The praseodymium and lanthanum oxide catalysts may be used by themselves, as mixtures, or they may be used in conjunction with a second catalyst whose function is to oxidize the hydrocarbon or carbon monoxide constituents of the exhaust gas. A catalyst emiently suited for this purpose is a supported copper-palladium catalyst as described in U.S. Pat. 3,224,981. The praseodymium or lanthanum oxide catalysts may be intimately mixed with the oxidation catalyst or the different catalysts may be stratified.

When used to decompose oxides of nitrogen in streams other than the exhaust stream of internal combustion engines, the catalyst is merely incorporated in the oxide of nitrogen containing stream so that intimate contact is obtained between the catalyst and the oxides of nitrogen. For example, in the discharge stream of a nitric acid plant employing the ammonia process for synthesizing nitric acid the spent gas containing nitric oxide is passed through the praseodymium or lanthanum oxide catalyst bed and the temperature of the bed maintained at a temperature of from about 400 to 1000° C.

What is claimed is:

1. A method of decomposing oxides of nitrogen comprising contacting a gas stream containing said oxides of nitrogen with a catalyst consisting essentially of from about 0.001 to 25 weight percent of lanthanum oxide on a suitable support at a temperature above about 400° C.

2. The method of claim 1 wherein said catalyst consists essentially of from 0.01 to 25 weight percent lanthanum oxide on a support consisting essentially of zirconia.

3. The method of claim 1 wherein said catalyst consists essentially of from 0.01 to 25 weight percent of lanthanum oxide on a support consisting essentially of zinc oxide.

4. A method of claim 1 wherein said gas stream is an internal combustion engine exhaust gas stream.

5. A method of claim 2 wherein said gas stream is an internal combustion engine exhaust gas stream.

6. A method of claim 1 wherein said contacting is carried out at a temperature of from about 400 to about 1000° C.

7. A method of claim 6 wherein said contacting is carried out at a temperature of from about 700 to about 850° C.

8. A method of claim 3 wherein said contacting is carried out at a temperature of about 700–850° C.

References Cited

UNITED STATES PATENTS

| | | | |
|---|---|---|---|
| 2,129,733 | 9/1938 | Fulton et al. | 252—462X |
| 2,152,908 | 4/1939 | Morrell et al. | 252—462X |
| 3,168,368 | 2/1965 | Mills | 23—2 |
| 3,453,331 | 7/1969 | Hargis et al. | 252—462X |

E. C. THOMAS, Primary Examiner

U.S. Cl. X.R.

23—159, 220, 221; 252—462